United States Patent
Wang (10) Patent No.: US 10,949,447 B2
(45) Date of Patent: Mar. 16, 2021

(54) BLOCKCHAIN-BASED DATA SYNCHRONIZING AND DATA BLOCK PARSING METHOD AND DEVICE

(71) Applicant: Advanced New Technologies Co., Ltd., George Town (KY)

(72) Inventor: Jiyuan Wang, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/888,614

(22) Filed: May 29, 2020

(65) Prior Publication Data

US 2020/0293549 A1    Sep. 17, 2020

Related U.S. Application Data

(63) Continuation of application No. PCT/CN2019/080032, filed on Mar. 28, 2019.

(30) Foreign Application Priority Data

Jun. 29, 2018 (CN) .................... 201810713472.X (51) Int. Cl.
*G06F 16/27* (2019.01)
*G06F 21/64* (2013.01)
(Continued)

(52) U.S. Cl.
CPC ............. *G06F 16/27* (2019.01); *G06F 21/64* (2013.01); *H04L 9/0643* (2013.01); *H04L 69/22* (2013.01); *H04L 2209/38* (2013.01)

(58) Field of Classification Search
CPC ........ G06F 16/27; G06F 16/275; G06F 21/24; H04L 9/0643; H04L 69/22; H04L 2209/38
(Continued)

(56) References Cited

U.S. PATENT DOCUMENTS

2002/0133812 A1* 9/2002 Little ..................... G06F 8/10
717/140
2008/0270453 A1* 10/2008 Bui ..................... G06F 16/907
(Continued)

FOREIGN PATENT DOCUMENTS

CN    106528746    3/2017
CN    106874393    6/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Hares Jami
(74) *Attorney, Agent, or Firm* — Fish & Richardson P.C.

(57) ABSTRACT

One or more implementations of the present specification provide a blockchain-based data processing method and device. Block data in a blockchain is synchronized by a data center to a local database of the data center. The data center is connect to the blockchain and a target application. A data usage request sent by the target application is received by the data center. In response to the data usage request, the local database is queried, by the data center, for requested data corresponding to the data usage request. The requested data is returned, by the data center, to the target application.

15 Claims, 2 Drawing Sheets

(51) Int. Cl.
*H04L 9/06* (2006.01)
*H04L 29/06* (2006.01)

(58) Field of Classification Search
USPC .......................................... 707/610–638, 758
See application file for complete search history.

(56) References Cited

U.S. PATENT DOCUMENTS

| | | | |
|---|---|---|---|
| 2012/0296929 A1* | 11/2012 | Hossain | G06F 16/951 |
| | | | 707/769 |
| 2016/0048500 A1* | 2/2016 | Hebert | G06F 40/295 |
| | | | 704/9 |
| 2016/0342977 A1* | 11/2016 | Lam | G06Q 20/0658 |
| 2018/0227119 A1* | 8/2018 | Bibera | H04L 9/0643 |
| 2018/0253451 A1* | 9/2018 | Callan | H04L 63/123 |
| 2019/0005469 A1* | 1/2019 | Dhupkar | G06Q 20/06 |
| 2019/0303621 A1* | 10/2019 | Baset | H04L 63/123 |
| 2019/0340689 A1* | 11/2019 | Gordon, III | H04L 9/0894 |
| 2020/0137154 A1* | 4/2020 | Wu | H04L 67/1065 |
| 2020/0252213 A1* | 8/2020 | Vijayan | H04L 9/32 |

FOREIGN PATENT DOCUMENTS

| | | |
|---|---|---|
| CN | 107239954 | 10/2017 |
| CN | 107657059 | 2/2018 |
| CN | 107918666 | 4/2018 |
| CN | 107943951 | 4/2018 |
| CN | 109086325 | 12/2018 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Appln. No. PCT/CN2019/080032, dated Jun. 27, 2019, 10 pages (with partial English translation).

Extended Search Report in European Application No. 19827111.6, dated Nov. 3, 2020, 8 pages.

Yang et al, "EtherQL: A Query Layer for Blockchain System," Big Data Analytics in the Social and Ubiquitous Context: 5th International Workshop on Modeling Social Media, MSM 2014, 5th International Workshop on Mining Ubiquitous and Social Environments, Muse 2014 and First International Workshop on Machine Le, Mar. 22, 2017, 12 pages.

* cited by examiner

BLOCKCHAIN-BASED DATA SYNCHRONIZING AND DATA BLOCK PARSING METHOD AND DEVICE

CROSS-REFERENCE TO RELATED APPLICATIONS

This application is a continuation of PCT Application No. PCT/CN2019/080032, filed on Mar. 28, 2019, which claims priority to Chinese Patent Application No. 201810713472.X, filed on Jun. 29, 2018, and each application is hereby incorporated by reference in its entirety.

TECHNICAL FIELD

The present specification relates to the field of network communications technologies, and in particular to, blockchain-based data processing methods and devices.

BACKGROUND

A blockchain technology, also referred to as a distributed ledger technology, is a new technology in which several computing devices participate in "accounting" to maintain a complete distributed database. In the current blockchain environment, it is extremely difficult to identify, collect, and analyze data in a blockchain. The main reason for this problem is that in the process of storing data in a distributed form in the blockchain, a globally unique hash code is usually used as a parent-child blood link between blocks. No connection can be established between the data information included in the block and the hash code, and no connection can be established between the data included in the block, so the blockchain is an inefficient and expensive way to store data. The blockchain data storage structure makes it difficult for the data stored in the blockchain to be used by the upper-layer application program, and causes a great bottleneck for the promotion and development of the blockchain technology.

SUMMARY

In view of the previously described problem, the present specification provides a blockchain-based data processing method. The method is applied to a data center connected to the blockchain and includes: synchronizing block data in the blockchain to a local database; receiving a data use request sent by a target application; and in response to the data use request, querying the local database for requested data corresponding to the data use request, and returning the requested data to the target application.

Preferably, synchronizing block data in the blockchain to a local database includes: monitoring a block height in the blockchain in real time; and synchronizing the block data of the latest block to the local database based on an enabled timing task when a change in the block height in the blockchain is detected.

Preferably, synchronizing block data in the blockchain to a local database includes: parsing the block data based on a predetermined parsing rule; and storing the block data obtained through parsing in the local database based on a predetermined storage format.

Preferably, the parsing rule is a plug-in parsing rule.

Preferably, the parsing rule includes one or more of a service scenario parsing rule, a data filtering rule, and a predetermined index field parsing rule.

Preferably, the predetermined storage format includes a JSON format.

Preferably, synchronizing block data in the blockchain to a local database further includes: generating a query index for the block data obtained through parsing, creating an index table based on a mapping relationship between the generated query index and the corresponding block data, and storing the index table in the local database.

Correspondingly, the present specification provides a blockchain-based data processing device. The device is applied to a data center connected to the blockchain and includes: a synchronization unit, configured to synchronize block data in the blockchain to a local database; a receiving unit, configured to receive a data use request sent by a target application; and a processing unit, configured to: in response to the data use request, query the local database for requested data corresponding to the data use request, and return the requested data to the target application.

Preferably, the synchronization unit is further configured to: monitor a block height in the blockchain in real time; and synchronize the block data of the latest block to the local database based on an enabled timing task when a change in the block height in the blockchain is detected.

Preferably, the synchronization unit is further configured to: parse the block data based on a predetermined parsing rule; and store the parsed block data in the local database based on a predetermined storage format.

Preferably, the parsing rule is a plug-in parsing rule.

Preferably, the parsing rule includes one or more of a service scenario parsing rule, a data filtering rule, and a predetermined index field parsing rule.

Preferably, the predetermined storage format includes a JSON format.

Preferably, the synchronization unit is further configured to: generate a query index for the block data obtained through parsing, create an index table based on a mapping relationship between the generated query index and the corresponding block data, and store the index table locally.

Correspondingly, the present specification further provides a computer device, including a storage device and a processor, where the storage device stores a computer program that can be run by the processor; and when the processor runs the computer program, steps of the previously described blockchain-based data processing method are performed.

Correspondingly, the present specification further provides a computer readable storage medium, where the medium stores a computer program; and when the computer program is run by a processor, steps of the previously described blockchain-based data processing method are performed.

Using the blockchain-based data processing method, device, computer device and computer-readable storage medium provided in the present specification, a data center is constructed between the blockchain and its upper-layer application (that is, target application). The data center synchronizes the block data in the blockchain to a local database. The data center can provide a more convenient data processing method for the target application based on the data storage mode and the data retrieval method of the local database, thereby alleviating the defect that the data in the blockchain is inconvenient to use.

DESCRIPTION OF IMPLEMENTATIONS

The blockchain can specifically refer to a P2P network system that is formed by nodes based on a consensus mechanism and that has a distributed data storage structure. In the blockchain, data is distributed in temporally consecutive "blocks", each block includes a data summary of a previous block, and data of all or some of the nodes is backed up, depending on a specific consensus mechanism (for example, POW, POS, DPOS, or PBFT). A person skilled in the art knows that, because the blockchain system runs under the corresponding consensus mechanism, it is difficult to tamper with the data recorded in the blockchain database. For example, for the blockchain based on the POW consensus mechanism, at least 51% of the computing capability of the entire network is needed to launch an attack to tamper with the existing data. Therefore, the blockchain system has incomparable data security and tamper-resistance features over other centralized database systems. The data in a block is generally recorded in the form of a transaction. There is no association between transactions, and each transaction cannot be associated with a summary of the data in the block (but only a mathematical association can be established by using, for example, a Merkel tree). Due to the lack of a uniform statistical analysis and indexing mechanism for the data in the block or the data in the transaction, the data in a blockchain can hardly be used by upper-layer applications in the blockchain.

Figure 1:
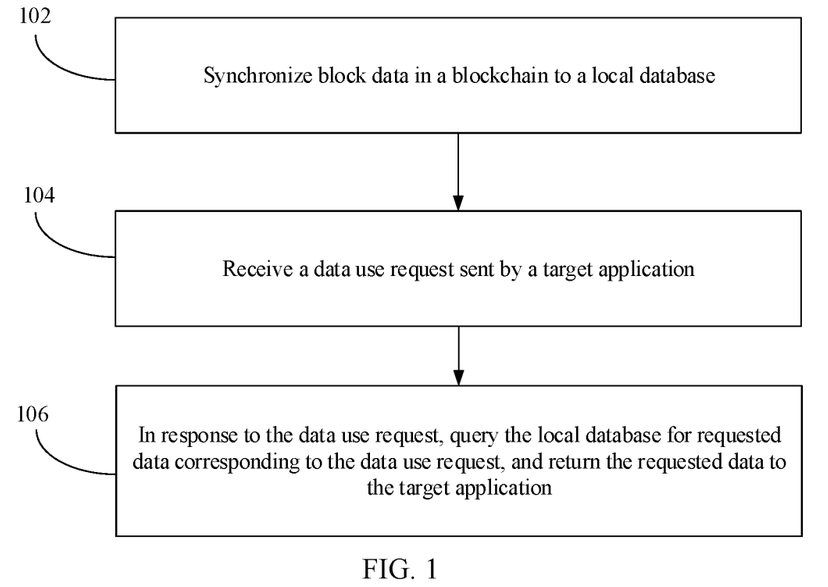
FIG. 1 is a flowchart illustrating a blockchain-based data processing method, according to an example implementation of the present specification.

To alleviate the previously described problem, FIG. 1 illustrates a flowchart of a blockchain-based data processing method according to an example implementation of the present specification. The method is applied to a data center connected to the blockchain and includes:

Step 102: Synchronize block data in the blockchain to a local database;

Step 104: Receive a data use request sent by a target application; and

Step 106: In response to the data use request, query the local database for requested data corresponding to the data use request, and return the requested data to the target application.

The "upper-layer application" or "target application" described in the implementations of the present specification refers to an application program constructed on the distributed data storage architecture of the blockchain, and can provide a data service for a specific service implementations of the application program (for example, a house leasing service, a vehicle dispatching service, an insurance claim settlement service, a credit service, and a medical service, etc.) by using a mechanism characteristic such as a blockchain consensus mechanism, a distributed database, or an automatically executable smart contract. The data center described in the implementations of the present specification refers to a data processing device that is communicatively connected to both the blockchain (which can serve as a node device of the blockchain) and a target application of the blockchain (which can also be referred to as an upper-layer application).

Figure 2:
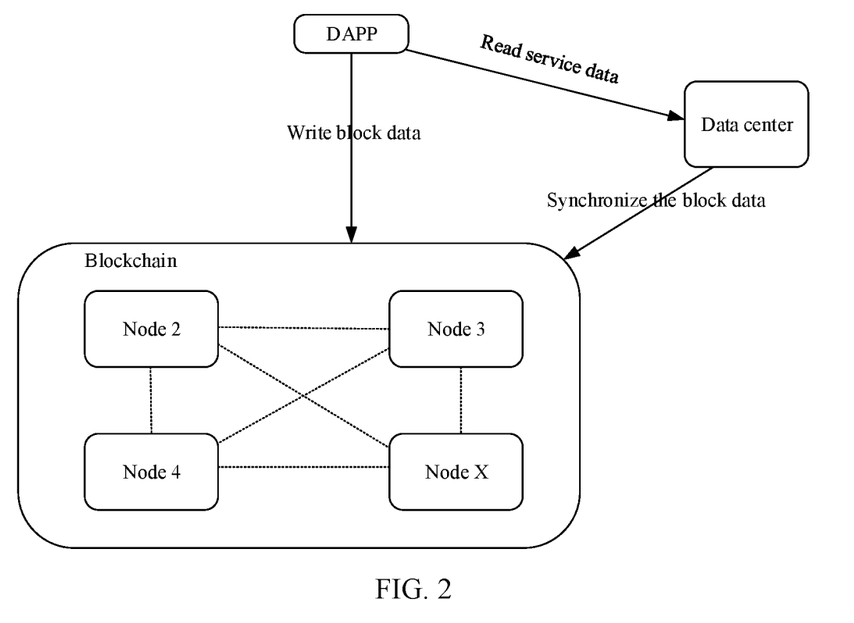
FIG. 2 is an architectural diagram illustrating collection between a blockchain system, an upper-layer application, and a data center, according to an example implementation of the present specification.

FIG. 2 is an architectural diagram illustrating collection between a blockchain system, an upper-layer application, and a data center, according to an example implementation of the present specification. The data center is connected to both the blockchain system and an upper-layer application decentralized application (DAPP) of the blockchain. The upper-layer application is also communicatively connected to the blockchain system so that the upper-layer application directly writes service data generated by the upper-layer application to a distributed database of the blockchain. By disposing a data center between the blockchain system and its upper-layer application DAPP, the block data in the blockchain is synchronized to the local database of the data center, and the requested data is provided for the data use request of the upper-layer application by using the data center. Because the data center can perform operations such as parsing, format changing, moving, etc. on the data stored in the local database, not limited by the characteristics of the blockchain, such as, the block data in the blockchain cannot be modified (for example, a storage format or a storage location) and data usage inconvenience caused by poor correlation between the data, the data center can be constructed to more conveniently provide a data service for an upper-layer application in the blockchain. The block data can include one or more of the following: all transaction data in a block, transaction summary data in a block, and summary data of a block, depending on a specific service need of the data center or an upper-layer application thereof. Further, a person skilled in the art should know that the previously described data center can provide a data service for a plurality of upper-layer applications. This is not limited in the present specification.

The transaction described in the present specification refers to a group of data that is created by a blockchain client and that needs to be finally published to a distributed database in the blockchain. A transaction in the blockchain has a narrow sense and a broad sense. A transaction in a narrow sense refers to a value transfer initiated to a user to the blockchain. For example, in a conventional bitcoin blockchain network, a transaction can be a transfer initiated by a user in the blockchain. A transaction in a broad sense refers to a group of service data that is sent by a user to the blockchain and that includes a service intention. For example, an operator can build a consortium blockchain based on an actual service need, and deploy some other types of online services unrelated to value transfer based on the consortium blockchain, such as loan application, a house leasing service, a vehicle dispatching service, an insurance claim settlement service, a credit service, and a medical service, etc. In this type of consortium blockchain, a transaction can be a service message or service request that is sent by a user in the consortium blockchain and that includes a service intention. The present specification does not limit the formats of the "transaction", which depends on the nature of the service of the blockchain described in the present specification.

In addition, in the implementations provided in the present specification, the blockchain and its target application (or its upper-layer application) can communicate with each other in many ways. For example, the blockchain can be directly connected to its upper-layer application, and the upper-layer application DAPP of the blockchain shown in FIG. 2 directly writes the service data generated by the DAPP into the blockchain. The present specification is not limited thereto. For example, the upper-layer application DAPP can send the service data generated by the upper-layer application DAPP to the data center for pre-processing or filtering, and then send the data that should be sent to the blockchain to the blockchain, thereby further saving the data space occupied by the blockchain.

In the implementations of the blockchain-based data processing method provided in FIG. 1, the order of steps 102—synchronize block data in the blockchain to a local database and 104—receive a data use request sent by a target application is not limited. The data center can first synchronize the latest block data in the blockchain to the local database based on a predetermined synchronization rule; and then receive a data use request sent by the target application, and process the data use request in the local database. Alternatively, the data center can first receive the data use request sent by the target application, and then synchronize the block data. In the latter case, if the received data use request includes a block height list that is related to the data use request or that needs to be obtained, the data center can selectively synchronize the block data of the blocks based on the heights included in the block height list, instead of obtaining the block data of all the blocks of the blockchain, thereby further saving the storage space of the data center and improving the utilization of the computer resources of the data center.

There are a plurality of implementations for the data center to synchronize the latest data in the blockchain to the local database. In an illustrated implementation, the data center maintains a real-time acquisition mode with the blockchain, that is, the data center obtains the latest block from the blockchain system in real time, and the data center can immediately synchronize a new block to the local database whenever the new block is broadcast and recorded in the blockchain system. When the data center synchronizes the block data in the blockchain to the local database in real time, the data delay is not likely to occur. However, the data center needs to maintain the state of downloading the block data in real time, and the block height of the blockchain does not increase in real time. This leads to a waste of the computing resources of the data center.

In another illustrated implementation, the data center can synchronize block data in the blockchain in an offline timing acquisition mode, that is, the data center enables the timing acquisition task to obtain new block data from the blockchain at predetermined intervals and synchronize the new block data to the local database. Compared with the previously described real-time acquisition mode, the offline timing acquisition mode increases the utilization of computer resources of the data center. However, because the data center cannot accurately know the time the block height increases, and data delay might occur; in addition, because the data center does not know details of the synchronized block, the block data obtained by the data center might not be the data needed by its target application, which increases a waste of computer resources.

Based on the previously described methods in which the data center synchronizes the block data in the blockchain to the local database, the present specification further provides an implementation to combine the advantages of the two data synchronization methods, that is, the data center can monitor the block height in the blockchain in real time; and then synchronize the block data of the latest block to the local database based on the enabled timing task when detecting a change in the block height in the blockchain.

Because the computer resources needed for real-time monitoring are much less than those needed for obtaining the block data of the new block in the blockchain in real time, when the data center synchronizes the block data in the blockchain in this implementation, utilization of the computer resources is significantly improved.

The data center can configure a specific timing task to synchronize the block data of the latest block to the local database based on the detected block height increase in the blockchain. By configuring the timing task, the data center can control a delay time of the block data obtained by the data center, a timing task with a higher acquisition frequency is provided for a block with a higher data timeliness, and a timing task with a lower acquisition frequency is provided for a block with a lower data timeliness, so that the computer resources of the data center are more reasonably utilized. In addition, because the data center should provide a data service for its upper-layer applications, the data needed for the service might exist in certain specific blocks. After detecting the specific blocks, the data center can obtain the blocks based on the enabled timing task, thereby further controlling the delay time of the needed data and improving utilization of the computer resources.

Another implementation of the present specification is provided in the specification, to more conveniently provide a data use service for a target application, the process in which the data center synchronizes block data in a blockchain to a local database further includes: parsing the block data based on a predetermined parsing rule, and storing the block data obtained through parsing in the local database in a predetermined storage format. The local database can be a standard relational database (for example, Rds) or a non-relational storage (for example, HBase), which is not limited in the present description.

Specifically, the parsing rule can be set based on a data content type recorded in the blockchain system or a specific service of a target application, including one or more of a service scenario parsing rule, a data filtering rule, or a predetermined index field parsing rule. Taking a house leasing scenario as an example, the blockchain records a variety of contents or types of transactions that are sent from different nodes or node clients, such as a house leasing contract transaction, a house deposit payment transaction and a house rent payment transaction, to serve as a blockchain ledger for the whole process of house leasing. Of course, a person skilled in the art should know that the blockchain can also be used for recording the ledger information of transactions in other service scenarios, and the transactions generated in various service scenarios are mixed and recorded in the blocks of the blockchain, and the transactions are not classified and stored in the blockchain based on the service types of the transactions. An upper-layer application for house leasing management is constructed in the blockchain, and various types of data information related to the house leasing service need to be obtained from the blockchain. To facilitate the data information acquisition, the data center provided in this implementation can parse the block information obtained from the blockchain, and store the information related to house leasing management that is obtained through parsing in a local database, so that the upper-layer application for house leasing management can be invoked at any time.

Specifically, the data center can set a house leasing service data model (for example, a Schema template), parse the block data by using the data model, and fill in the data model with corresponding data. For example, the house leasing service data model can include a house leasing contract number, a house lessor ID, a house lessee ID, a house address, a deposit, a rent, a leasing period, etc. By parsing the transaction content data one by one in the block, the corresponding data information can be filled in the model and stored in a local database based on a data text saving type of the local database, such as a JSON format. In the data parsing process, some filtering rules can also be used. For example, a specific public key rule can be used to select a transaction issued by using the specific public key for data parsing, or a public key blacklist can be used to ignore parsing the transaction issued by using the public key in the blacklist, thereby filtering out dirty data to save computer resources. A classification rule can also be used to classify transactions in a block, and filter out transactions that are not related to a house leasing service, so that data parsing is only performed for a target service. In the specific parsing process, a predetermined index field parsing rule can also be used. In this example, service index fields needed for an upper-layer application are set, such as "leasing contract number", "house size", and "lease identity card number", and the synchronized block data is parsed one by one.

It is worthwhile to note that the process of parsing based on various parsing rules can be set as a plug-in executable program, so as to flexibly apply various parsing rules or flexibly apply a combination of various parsing rules to different service scenarios, thereby improving the efficiency of data parsing. In addition, the parsing process can include operations such as signature verification, encryption or decryption, and desensitization of data. Details are omitted for simplicity.

The data generated based on the parsing rules is generally in a key-value format, such as leasing contract number-1234567, lessee identity card number-1XXXXXXXXXXX, etc. To facilitate retrieval of the stored data by the data center, in another implementation provided in the present specification, the data center can generate a query index for the data that is obtained through parsing, create an index table based on a mapping relationship between the generated query index and the corresponding block data, and store the index table in the local database. The following describes various functions that a data center can implement in a house leasing service.

Figure 3:
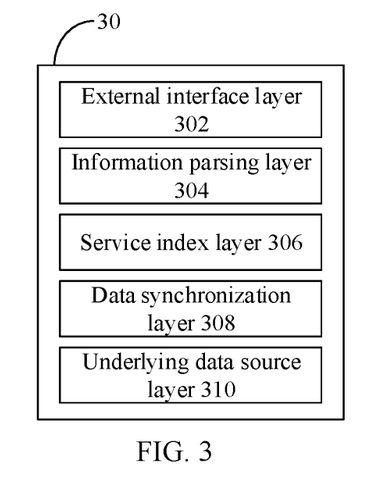
FIG. 3 is an architectural diagram illustrating a data center, according to an example implementation of the present specification.

FIG. 3 illustrates an architecture of a data center 30 that can provide a data processing service for the upper-layer application of house leasing management. The data center 30 can be divided into a plurality of layers such as an external interface layer 302, an information parsing layer 304, a service index layer 306, a data synchronization layer 308, and an underlying data source layer 310, to provide data processing operations such as transaction information data retrieval, statistics collection, and analysis for the upper-layer application. It is worthwhile to note that the multi-layer architecture is generically and artificially divided only on the basis of data processing functions executable by the data center. There is no specific demarcation between the layers, and the functions that can be implemented by the data center provided in the present specification are not limited thereto.

The block data recorded in the blockchain can include the following transaction information:
Transaction 00: {txhash: tx00, contract No.: 12345678, housecode: 0001, land lord: A, tenant name: B and C}
Transaction 01: {txhash: tx01, contract No.: 12345678, deposit: 500, month rent for B: 999, month rent for C: 888}
Transaction 11: {txhash: tx11, contract No.: 12345678 housecode: 0001 pay_channel: 10001 pay_amount: 999}
Transaction 21: {txhash: tx21, contract No.: 12345678 housecode: 0001 pay_channel: 10002 pay_amount: 888}

The data synchronization layer 308 of the data center can synchronize the block data in the blockchain to the local database based on a predetermined synchronization policy (for example, a real-time mode, an off-line mode, or a real-time/off-line combination mode). The information parsing layer 304 is configured to parse the synchronized block data, for example, by using a house leasing contract parsing model. In addition, the information parsing layer 304 is further configured to pre-process the data that is obtained through parsing, such as data sorting or merging, or data desensitization or encryption. In this example, after the data is processed by the information parsing layer, the data center can obtain the following data:

{contract No.: 12345678, housecode: 0001, land lord: A, tenant name: B and C} deposit: 500, month rent for B: 999, month rent for C: 888}

The house leasing contract data that is obtained through parsing can be stored in the JSON format at the underlying data source layer 310, where a standard relational database form or a non-relational database form can be used.

Similarly, the information parsing layer 304 of the data center can also parse the rent payment transaction submitted by the lessee by using an index field parsing rule, for example, using the index data fields "txhash", "pay_channel" (Note: Use of different pay_channels indicates that the data center can simultaneously obtain block data from different blockchains or from different child chains in a same blockchain), and "pay_amount" to parse the transaction, to obtain the following data shown in Table 1:

TABLE 1

Data obtained by the data center through parsing based on the index field parsing rules

| Txhash | Pay-channel | Pay-amount |
| --- | --- | --- |
| Tx11 | 10001 | 999 |
| Tx21 | 10002 | 888 |
| ... | ... | ... |

The data obtained through parsing can be stored at the underlying data source layer 310. In addition, to further facilitate retrieval and management of the rental payment transaction, the data center can generate a query index for the data, create an index table based on the mapping relationship between the generated query index and the corresponding block data (as shown in Table 2), and store the index table at the service index layer 306 of the data center. Similarly, the service index layer 306 can also store a table of mapping between each data index related to the house leasing contract information and a storage location of each piece of data at the underlying data source layer 310.

TABLE 2

Rent payment index table of the house leasing service that is stored at the service index layer 306 of the data center

| COLUMN_NAME | COLUMN_VALUE | TXHASH |
|---|---|---|
| pay_channel | 10001 | tx11 |
| pay_channel | 10002 | tx21 |
| pay_amount | 999 | tx11 |
| pay_amount | 888 | tx21 |
| ... | ... | ... |

The external interface layer 302 of the data center 30 can interact with upper-layer data by using a RESTFUL API, to provide data services in a URL method. In addition, the external interface layer 302 is compatible with platforms with a plurality of languages (such as C #, Python, C ++, and JAVA). In this example, the upper-layer application can send a data query request to the data center 30 to query the leasing contract details of house 0001 in a URL format. After parsing the request, the data center 30 determines the storage location of the data related to the contract details at the underlying data source layer 310 from the service index layer 306 of the data center 30, obtains the data related to the contract details data request from the underlying data source layer 310, organizes the data in a JSON format, and returns the data to the target application:

For example, taking data organized in the JSON format as an example, the returned data content can include:
{"content": {
contract No.: 12345678,
housecode: 0001,
land lord: A,
tenant name: B and C}
deposit: 500,
month rent for B: 999,
month rent for C: 888,
url: http://asassa.com}}

According to the data processing method applied to the data center 30 connected to the blockchain, a data storage structure that is more suitable for the upper-layer applications is established in the local database of the data center 30, so that a data service is conveniently provided for the upper-layer applications in various service scenarios, thereby alleviating the bottleneck problem encountered in the promotion and development of the blockchain technology.

Figure 5:
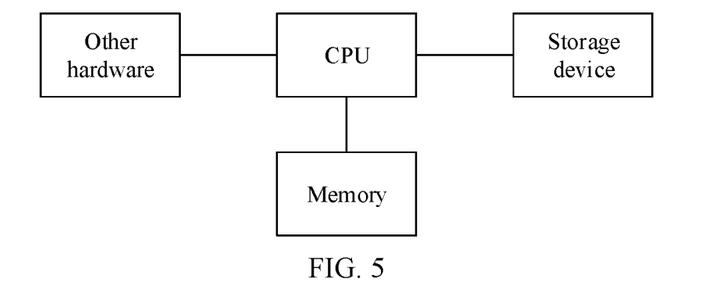
FIG. 5 is a diagram illustrating a hardware structure for running a blockchain-based data processing method or device implementation according to the present specification.

Corresponding to the previously described process implementation, an implementation of the present specification further provides a blockchain-based data processing device. The device can be implemented by using software, hardware, or a combination thereof. The software-based implementation is used as an example. As a logic device, the device is formed by reading, by the central processing unit (CPU) in a device where the device is located, corresponding computer program instructions to a memory for running. At the hardware level, in addition to the CPU, the memory, and the storage device shown in FIG. 5, the device in which the data processing device is located generally includes other hardware such as a chip for transmitting and receiving wireless signals, and/or other hardware such as a board for implementing a network communication function.

Figure 4:
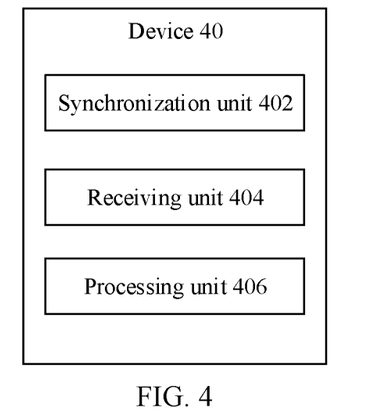
FIG. 4 is a schematic diagram illustrating a blockchain-based data processing device, according to an example implementation of the present specification.

FIG. 4 illustrates a blockchain-based data processing device 40 according to the present specification. The device 40 is applied to a data center connected to the blockchain and includes: a synchronization unit 402, configured to synchronize block data in the blockchain to a local database; a receiving unit 404, configured to receive a data use request sent by a target application; and a processing unit 406, configured to: in response to the data use request, query the local database for requested data corresponding to the data use request, and return the requested data to the target application.

Preferably, the synchronization unit 402 is further configured to: monitor a block height in the blockchain in real time; and synchronize the block data of the latest block to the local database based on an enabled timing task when a change in the block height in the blockchain is detected.

Preferably, the synchronization unit 402 is further configured to: parse the block data based on a predetermined parsing rule; and store the parsed block data in the local database based on a predetermined storage format.

Preferably, the parsing rule is a plug-in parsing rule.

Preferably, the parsing rule includes one or more of a service scenario parsing rule, a data filtering rule, and a predetermined index field parsing rule.

Preferably, the predetermined storage format includes a JSON format.

Preferably, the synchronization unit 402 is further configured to: generate a query index for the block data obtained through parsing, create an index table based on a mapping relationship between the generated query index and the corresponding block data, and store the index table locally.

For a detailed implementation process of the functions of the modules in the previously described device, references can be made to the implementation process of the corresponding steps in the method implementation. Details are omitted here for simplicity.

The previously described device implementations are merely examples, where the units described as separate parts can or does not have to be physically separate, and components displayed as units can or does not have to be physical units, can be located in one place, or can be distributed on a plurality of network units. Based on actual needs, some or all of these modules can be selected to implement the purpose of the present specification. A person of ordinary skill in the art can understand and implement the blockchain-based data processing device without creative efforts.

The devices, units, or modules illustrated in the previously described implementations can be implemented by computer chips, entities, or products having a certain function. A typical implementation device is a computer in the form of a personal computer, a laptop computer, a cellular phone, a camera phone, a smart phone, a personal digital assistant, a media player, a navigation device, an e-mail transceiver, a game console, a tablet computer, a wearable device, or any combination of several of these devices.

Corresponding to the previously described method implementations, an implementation of the present specification further provides a computer device, where the computer device includes a storage device and a processor. The storage device stores a computer program that can be run by the processor. When the processor runs the stored computer program, steps of the blockchain-based data processing method performed by the data center in the implementation of the present specification are performed. For a detailed description of the steps of the blockchain-based data processing method performed by the data center, references can be made to the above descriptions. Details are omitted here for simplicity.

Corresponding to the previously described method implementations, an implementation of the present specification further provides a computer readable storage medium, where the medium stores a computer program; and when the computer program is run by a processor, steps of the blockchain-based data processing method performed by the data center in the implementation of the present specification are performed. For a detailed description of the steps of the blockchain-based data processing method performed by the data center, references can be made to the above descriptions. Details are omitted here for simplicity.

The above descriptions are merely better implementations of one or more implementations of the present specification, and are not intended to limit the present specification. Any modification, equivalent replacement, improvement, etc., made without departing from the spirit and principles of the present specification shall fall within the protection scope of the present specification.

In a typical configuration, a computing device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data.

Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer readable medium does not include transitory media such as a modulated data signal and carrier.

It is worthwhile to note that terms "include", "comprise" or any other variant is intended to cover non-exclusive inclusion, so that processes, methods, products or devices that include a series of elements include not only those elements but also other elements that are not explicitly listed, or elements inherent in such processes, methods, products or devices. An element described by "includes a . . . " further includes, without more constraints, another identical element in the process, method, product, or device that includes the element.

A person skilled in the art should understand that the implementations of the present specification can be provided as methods, systems, or computer program products. Therefore, the implementations of the present specification can take a form of hardware implementations, software implementations, or both. Further, the implementations of the present specification can take a form of computer program products implemented on one or more computer-usable storage media (including but not limited to a disk storage device, CD-ROM, and an optical storage device) containing computer-usable program code.

What is claimed is:

1. A computer-implemented method, comprising:
synchronizing, by a data center, block data in a blockchain to a local database of the data center, wherein the data center is connected to the blockchain and a target application, the synchronizing includes obtaining parsed block data by parsing the block data based on a parsing rule associated with a service type of the target application, and storing the parsed block data in the local database based on a storage format associated with the service type of the target application;
receiving, by the data center, a data usage request sent by the target application;
in response to the data usage request, querying, by the data center, the local database for requested data corresponding to the data usage request; and
returning, by the data center, the requested data to the target application.

2. The computer-implemented method of claim 1, wherein parsing the block data based on the parsing rule is implemented as a plug-in to an executable program.

3. The computer-implemented method of claim 1, wherein the parsing rule comprises one or more of a service scenario parsing rule, a data filtering rule, and an index field parsing rule.

4. The computer-implemented method of claim 1, wherein the storage format comprises a JSON format.

5. The computer-implemented method of claim 1, wherein synchronizing the block data in the blockchain to the local database comprises:
generating a query index for the parsed block data;
creating an index table based on a mapping relationship between the query index and the parsed block data; and
storing the index table in the local database.

6. A non-transitory, computer-readable medium storing one or more instructions executable by a computer system to perform operations comprising:
synchronizing, by a data center, block data in a blockchain to a local database of the data center, wherein the data center is connected to the blockchain and a target application, the synchronizing includes obtaining parsed block data by parsing the block data based on a parsing rule associated with a service type of the target application, and storing the parsed block data in the local database based on a storage format associated with the service type of the target application;
receiving, by the data center, a data usage request sent by the target application;
in response to the data usage request, querying, by the data center, the local database for requested data corresponding to the data usage request; and
returning, by the data center, the requested data to the target application.

7. The non-transitory, computer-readable medium of claim 6, wherein parsing the block data based on the parsing rule is implemented as a plug-in to an executable program.

8. The non-transitory, computer-readable medium of claim 6, wherein the parsing rule comprises one or more of a service scenario parsing rule, a data filtering rule, and an index field parsing rule.

9. The non-transitory, computer-readable medium of claim 6, wherein the storage format comprises a JSON format.

10. The non-transitory, computer-readable medium of claim 6, wherein synchronizing the block data in the blockchain to the local database comprises:

generating a query index for the parsed block data;
creating an index table based on a mapping relationship between the query index and the parsed block data; and
storing the index table in the local database.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  synchronizing, by a data center, block data in a blockchain to a local database of the data center, wherein the data center is connected to the blockchain and a target application, the synchronizing includes obtaining parsed block data by parsing the block data based on a parsing rule associated with a service type of the target application, and storing the parsed block data in the local database based on a storage format associated with the service type of the target application;
  receiving, by the data center, a data usage request sent by the target application;
  in response to the data usage request, querying, by the data center, the local database for requested data corresponding to the data usage request; and
  returning, by the data center, the requested data to the target application.

12. The computer-implemented system of claim 11, wherein parsing the block data based on the parsing rule is implemented as a plug-in to an executable program.

13. The computer-implemented system of claim 11, wherein the parsing rule comprises one or more of a service scenario parsing rule, a data filtering rule, and an index field parsing rule.

14. The computer-implemented system of claim 11, wherein synchronizing the block data in the blockchain to the local database comprises:
  generating a query index for the parsed block data;
  creating an index table based on a mapping relationship between the query index and the parsed block data; and
  storing the index table in the local database.

15. The computer-implemented system of claim 11, wherein the storage format comprises a JSON format.

* * * * *